United States Patent
Kakeno et al.

(10) Patent No.: US 10,618,421 B2
(45) Date of Patent: Apr. 14, 2020

(54) FUEL CELL SYSTEM

(71) Applicant: TOYOTA JIDOSHA KABUSHIKI KAISHA, Toyota-shi, Aichi-ken (JP)

(72) Inventors: Yuji Kakeno, Nisshin (JP); Shinji Aso, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 248 days.

(21) Appl. No.: 15/955,851

(22) Filed: Apr. 18, 2018

(65) Prior Publication Data
US 2018/0304766 A1     Oct. 25, 2018

(30) Foreign Application Priority Data
Apr. 24, 2017   (JP) ................. 2017-085056

(51) Int. Cl.
*B60L 58/40*     (2019.01)
*B60L 11/18*     (2006.01)
(Continued)

(52) U.S. Cl.
CPC .......... *B60L 11/1887* (2013.01); *B60L 1/003* (2013.01); *B60L 7/18* (2013.01); *B60L 15/20* (2013.01);
(Continued)

(58) Field of Classification Search
CPC combination set(s) only.
See application file for complete search history.

(56) References Cited

U.S. PATENT DOCUMENTS

2010/0332060 A1*  12/2010  Bae ............... B60L 58/40
                                                  701/22
2015/0105951 A1*   4/2015  Yu  ............... B60L 3/0046
                                                  701/22
(Continued)

FOREIGN PATENT DOCUMENTS

JP     2004-312962 A    11/2004
JP     2009-196404 A     9/2009
(Continued)

*Primary Examiner* — Christopher P Domone
(74) *Attorney, Agent, or Firm* — Dickinson Wright PLLC

(57) ABSTRACT

A fuel cell system to be mounted on a vehicle includes: a fuel cell for generating electric power by using reactant gas; a secondary battery capable of charging and discharging electric power; a converter electrically connected between a drive motor for driving the vehicle and the secondary battery to perform voltage conversion between the drive motor and the secondary battery; and a controller for controlling the fuel cell system. The controller exerts such control that when an accelerator for accepting a speed control instruction for the vehicle has accepted a deceleration instruction under a condition that a charge rate of the secondary battery is equal to or more than a preset value, or when the accelerator has accepted a deceleration instruction under a condition that a chargeable electric power of the secondary battery is equal to or less than a preset value, electric power is discharged from the secondary battery during a period of power-running operation lasting until the drive motor with its torque being decreased shifts to regenerative operation. Thus, increases in frequency at which the auxiliary machine is operated to consume regenerative power can be suppressed.

4 Claims, 2 Drawing Sheets

(51) Int. Cl.
  *B60L 15/20* (2006.01)
  *B60L 58/15* (2019.01)
  *H02P 3/14* (2006.01)
  *B60L 7/18* (2006.01)
  *B60L 1/00* (2006.01)
  *B60L 50/75* (2019.01)
  *H02P 6/08* (2016.01)

(52) U.S. Cl.
  CPC ........... *B60L 15/2009* (2013.01); *B60L 50/75* (2019.02); *B60L 58/15* (2019.02); *B60L 58/40* (2019.02); *H02P 3/14* (2013.01); *H02P 6/08* (2013.01); *B60L 2200/32* (2013.01); *B60L 2210/10* (2013.01); *B60L 2240/526* (2013.01); *B60L 2240/54* (2013.01); *B60L 2240/80* (2013.01); *B60L 2250/26* (2013.01); *B60L 2270/142* (2013.01); *B60L 2270/145* (2013.01); *H02P 2201/07* (2013.01); *Y02T 10/7258* (2013.01)

(56) References Cited

U.S. PATENT DOCUMENTS

2015/0258897 A1* 9/2015 Okada ..................... B60L 7/14
                                                  318/376
2016/0243958 A1* 8/2016 Miller ................. B60L 11/1816

FOREIGN PATENT DOCUMENTS

| JP | 2010-058579 A | 3/2010 |
| JP | 2013-150388 A | 8/2013 |

* cited by examiner

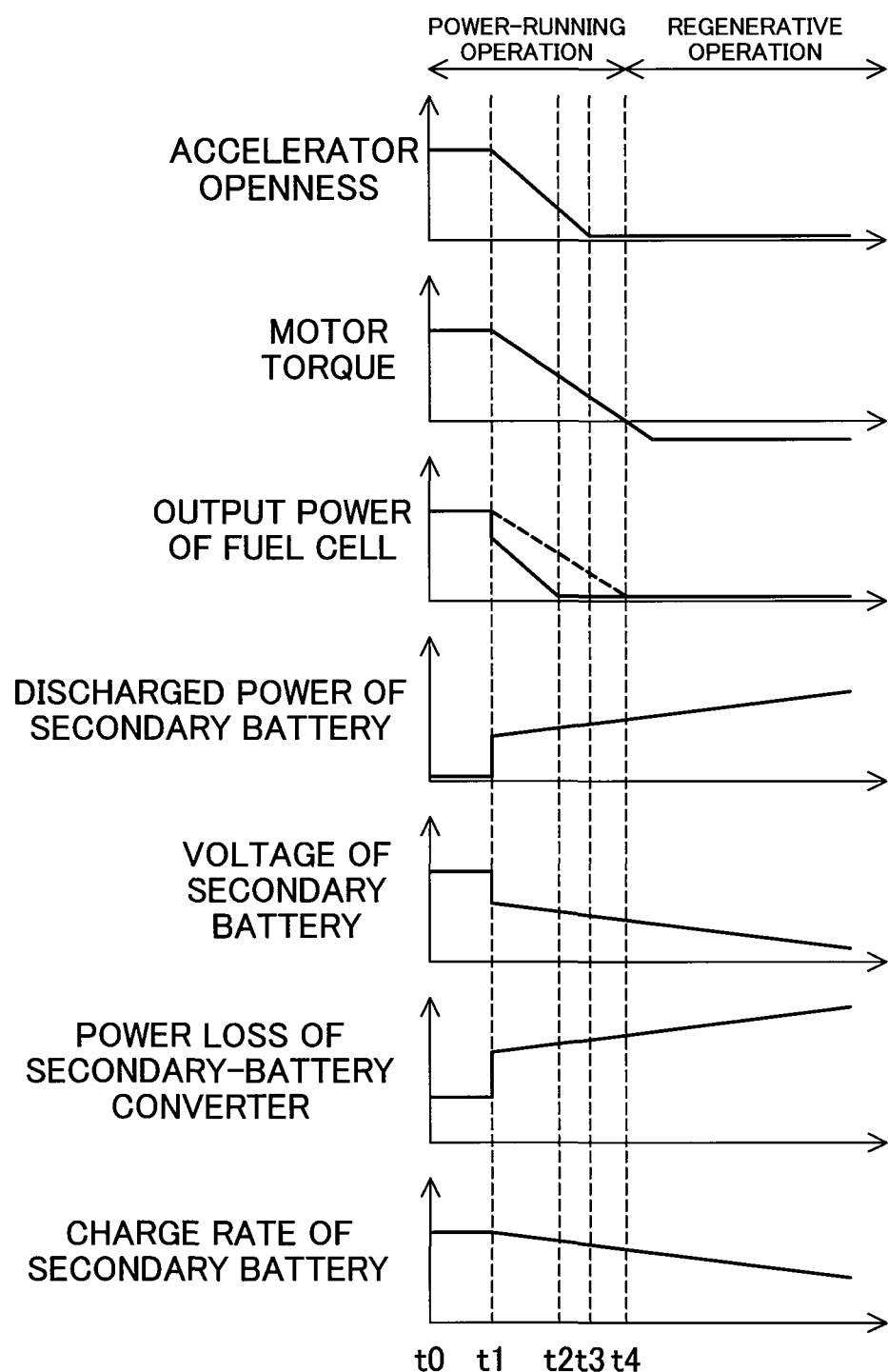

FUEL CELL SYSTEM

CROSS-REFERENCE TO RELATED APPLICATIONS

The present application claims priority from Japanese patent application 2017-085056 filed on Apr. 24, 2017, the entirety of the content of which is hereby incorporated by reference into this application.

BACKGROUND

Field

The present disclosure relates to a fuel cell system.

Related Art

Among conventional fuel cell systems to be mounted on a vehicle is one in which a secondary battery is charged with regenerative electric power developed by regenerative operation of a drive motor. There is also known a technique that, with restrictions on charging of the secondary battery, auxiliary machines are operated to consume the regenerative power.

As to the control device of JP 2013-150388 A, with restrictions on charging of the secondary battery, it would be the case that regenerative electric power is consumed by exploiting power losses due to electric power circulation developed in two motor generators. However, as a problem such a control device has suffered, insufficient consumption of regenerative power would cause auxiliary machines to be operated at increased frequencies for consumption of the regenerative power, leading to increases in vibrations and noise caused by the auxiliary machines. In order to solve such problems, there is a desire for a technique that enables suppression of increases in operating frequencies of the auxiliary machines involved in consumption of regenerative power.

SUMMARY

In one aspect of the present disclosure, there is provided a fuel cell system. The fuel cell system, which is to be mounted on a vehicle, includes: a fuel cell for generating electric power by using reactant gas; a secondary battery capable of charging and discharging electric power; a converter electrically connected between a drive motor for driving the vehicle and the secondary battery to perform voltage conversion between the drive motor and the secondary battery; and a controller for controlling the fuel cell system, wherein the controller exerts such control that when an accelerator for accepting a speed control instruction for the vehicle has accepted a deceleration instruction under a condition that a charge rate of the secondary battery is equal to or more than a preset value, or when the accelerator has accepted a deceleration instruction under a condition that a chargeable electric power of the secondary battery is equal to or less than a preset value, electric power is discharged from the secondary battery during a period of power-running operation lasting until the drive motor with its torque being decreased shifts to regenerative operation.

BRIEF DESCRIPTION OF DRAWINGS

FIG. 2 is a timing chart showing exemplary status transitions during a period since an accelerator's acceptance of a deceleration instruction until a drive motor's end of regenerative operation.

DETAILED DESCRIPTION

A. First Embodiment

Figure 1:
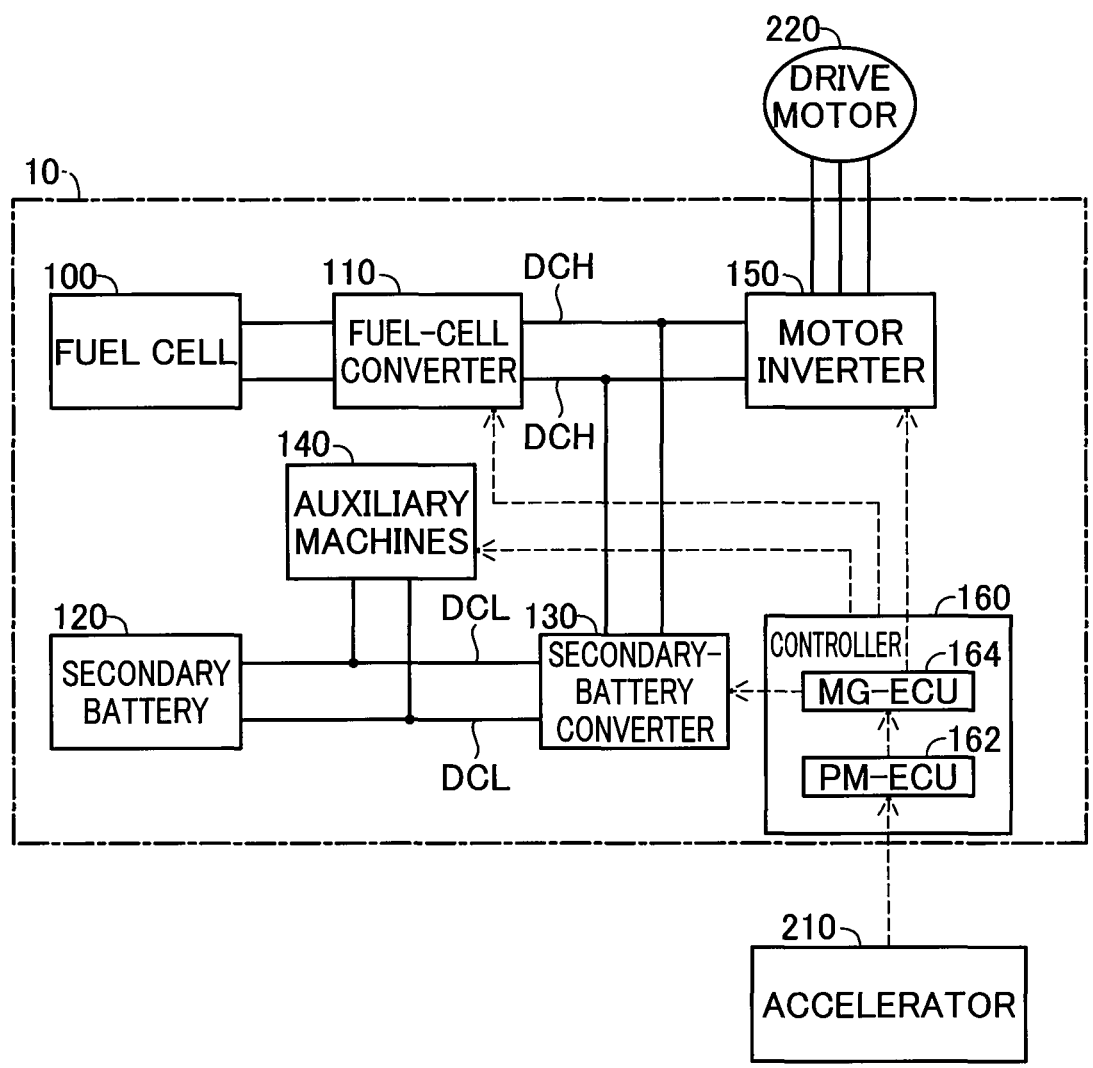
FIG. 1 is a block diagram showing an outlined configuration of a fuel cell system according to a first embodiment.

FIG. 1 is a block diagram showing an outlined configuration of a fuel cell system 10 according to a first embodiment of the disclosure. The fuel cell system 10 is mounted as a power source of a vehicle that is driven by a drive motor 220. The fuel cell system 10 includes a fuel cell 100, a fuel-cell converter 110, a secondary battery 120, a secondary-battery converter 130, auxiliary machines 140, a motor inverter 150, and a controller 160.

The fuel cell 100 is a unit which generates electric power through electrochemical reactions of hydrogen and oxygen. The fuel cell 100 is made up by stacking a plurality of unit cells in layers. Each unit cell is a power generation element capable of power generation by itself alone, including an MEGA (Membrane-Electrode Gas-diffusion-layer Assembly) in which gas diffusion layers are provided on both sides, respectively, of an MEA (Membrane Electrode Assembly) having an electrolyte membrane, and separators placed on two outer sides, respectively, of the MEGA. The electrolyte membrane is formed from solid polymer thin film which exhibits successful proton conductivity in a wet condition with moisture contained inside thereof. As to the fuel cell 100, although various types are applicable, a solid polymer type one is used in this embodiment. The fuel cell 100 is electrically connected to the fuel-cell converter 110.

The fuel-cell converter 110 is a step-up type converter device which performs step-up operation for stepping up output voltage of the fuel cell 100 to a target voltage. The fuel-cell converter 110, including a reactor and a switching device which are unshown, performs control of electrical conduction to the reactor by using the switching device. Magnetic energy accumulated in the reactor with the switching device in on-state is turned into an induction voltage with the switching device in off-state. The induction voltage is outputted as it is superimposed on the output voltage of the fuel cell 100, by which voltage step-up is fulfilled. In this way, the fuel-cell converter 110 performs switching for conversion of the output power of the fuel cell 100. The fuel-cell converter 110 is electrically connected to the motor inverter 150 via a high-voltage DC line DCH.

The secondary battery 120 functions as a power source of the fuel cell system 10 together with the fuel cell 100. In this embodiment, the secondary battery 120 is configured with a lithium ion battery. In other embodiments, the secondary battery 120 may be a battery of other types such as lead storage battery, nickel-cadmium battery, and nickel hydrogen battery. The secondary battery 120 is electrically connected to the secondary-battery converter 130 via a low-voltage DC line DCL.

The secondary-battery converter 130 is a step-up/down type converter device, which resembles the fuel-cell converter 110 in configuration. The secondary-battery converter 130 is electrically connected to the fuel-cell converter 110 and the motor inverter 150 via the high-voltage DC line DCH. The secondary-battery converter 130 regulates voltage in the high-voltage DC line DCH, i.e. input voltage of the motor inverter 150, to control charging/discharging of the secondary battery 120.

The secondary-battery converter 130 makes the secondary battery 120 discharge when the output power from the fuel-cell converter 110 is insufficient for a target output power. By contrast, when regenerative power is developed in the drive motor 220, the secondary-battery converter 130 converts and delivers the regenerative power to the low-voltage DC line DCL side. The secondary-battery converter 130 is also enabled to convert and deliver output power of the fuel cell 100 to the low-voltage DC line DCL side. In addition, the secondary-battery converter 130 may be different in configuration from the fuel-cell converter 110.

The auxiliary machines 140 are those to be used for operation of the fuel cell 100. The auxiliary machines 140 operate by consuming electric power. The auxiliary machines 140 include, for example, an air compressor for supplying air as cathode gas to the fuel cell 100, a hydrogen circulation pump for circulating hydrogen as anode gas, a cooling device for cooling the fuel cell 100, a humidifying device for humidifying gas supplied to the fuel cell 100, and the like. The auxiliary machines 140 are electrically connected to the low-voltage DC line DCL.

The motor inverter 150 converts electric power, which is supplied in direct current via the high-voltage DC line DCH from the fuel cell 100 and the secondary battery 120, into three-phase AC power. The motor inverter 150 is electrically connected to the drive motor 220 to supply three-phase AC power to the drive motor 220. Also, the motor inverter 150 converts regenerative power, which is generated in the drive motor 220, into DC power and delivers the power to the high-voltage DC line DCH.

The controller 160 receives signals outputted from various types of sensors provided in the fuel cell system 10, and controls operations of individual parts in the fuel cell system 10 by using the received signals. The controller 160 includes a PM-ECU 162 and an MG-ECU 164.

The PM-ECU 162 is an administrative controller for administratively controlling operations of various control parts (not shown) including the MG-ECU 164. The PM-ECU 162 transmits, to the MG-ECU 164, a signal indicative of a vehicle-speed control instruction accepted by a later-described accelerator 210.

The MG-ECU 164 is a high-voltage unit control part. The MG-ECU 164 controls operations of the secondary-battery converter 130 and the motor inverter 150 in response to a signal indicative of a vehicle-speed control instruction received from the PM-ECU 162.

The vehicle having the fuel cell system 10 mounted thereon includes an accelerator 210 and a drive motor 220. The accelerator 210 accepts a vehicle-speed control instruction from a driver of the vehicle having the fuel cell system 10 mounted thereon. The controller 160 receives a signal indicative of a control instruction delivered from the accelerator 210, and controls the drive of the vehicle by the drive motor 220.

The drive motor 220 is an electric motor which is driven on electric power supplied from the fuel cell 100 and the secondary battery 120. When the accelerator 210 has accepted a deceleration instruction, the drive motor 220 makes torque level decreased until transition to regenerative operation. In this embodiment, the drive motor 220 shifts from power-running operation to regenerative operation when a certain time has elapsed since the accelerator openness coming to zero subsequent to the accelerator 210's acceptance of the deceleration instruction. The term, accelerator openness, refers to a ratio (%) of a degree of actual operation to a total movable range of the accelerator 210. In other embodiments, the drive motor 220 may shift from power-running operation to regenerative operation at a time when the torque comes to a set value or lower.

FIG. 2 is a timing chart showing exemplary status transitions, in a vehicle having the fuel cell system 10 mounted thereon, during a period from acceptance of a deceleration instruction by the accelerator 210 until an end of regenerative operation by the drive motor 220. Shown in FIG. 2 are time-series variations of accelerator openness in the accelerator 210, motor torque in the drive motor 220, output power outputted by the fuel cell 100, discharge power discharged by the secondary battery 120, voltage of the secondary battery 120, power loss in the secondary-battery converter 130, and charge rate of the secondary battery 120.

In this embodiment, the power loss in the secondary-battery converter 130 is calculated with mapped values previously stored in the controller 160. In other embodiments, the power loss in the secondary-battery converter 130 may be calculated based on an estimated formula determined by experiments.

The charge rate of the secondary battery 120 refers to a ratio of remaining charged level to full charge capacity of the secondary battery 120.

During a period from timing t0 to timing t1 in FIG. 2, the driver of the vehicle having the fuel cell system 10 mounted thereon maintains the accelerator openness constant. Therefore, the motor torque and the output power of the fuel cell 100 are held constant. Since electric power is not discharged from the secondary battery 120, there is no change in voltage or charge rate of the secondary battery 120. During the period from the timing t0 to the timing t1 in FIG. 2, the charge rate of the secondary battery 120 keeps at a preset value or more. In this embodiment, the preset value of charge rate of the secondary battery 120 is 70%. In other embodiments, the preset value of charge rate of the secondary battery 120 may be higher or lower than 70%.

During a period from timing t1 to timing t2 in FIG. 2, the motor torque decreases as the accelerator 210 accepts a deceleration instruction from the driver of the vehicle having the fuel cell system 10 mounted thereon. The deceleration instruction by the driver for the accelerator 210 is executed by the driver's decreasing the accelerator openness. In this case, the controller 160 controls the fuel-cell converter 110 to decrease the level of output power of the fuel cell 100 by a decrement or more, responsive to the deceleration instruction. A broken line from the timing t1 to the timing t2 in fuel-cell output power in FIG. 2 shows a decrement in output power of the fuel cell 100 responsive to the deceleration instruction.

In the case where the accelerator 210 accepts a deceleration instruction from the driver of the vehicle having the fuel cell system 10 mounted thereon at the timing t1 in FIG. 2, since the charge rate of the secondary battery 120 is equal to or more than a preset value, the controller 160 controls the secondary-battery converter 130 so that electric power is discharged from the secondary battery 120 to the drive motor 220. During the period from the timing t1 to the timing t2 in FIG. 2, a portion of electric power that has been decreased in excess of an output-power decrement of the fuel cell 100 responsive to the deceleration instruction, out of a total decrement of the output power of the fuel cell 100, is compensated by discharge from the secondary battery 120. Because of this, electric power discharged by the secondary battery 120 increases during the period from the timing t1 to the timing t2 in FIG. 2. As the secondary battery 120 discharges electric power, the voltage of the secondary battery 120 decreases while the charge rate of the secondary battery 120 also decreases. In addition, during the period from the timing t1 to the timing t2 in FIG. 2, the secondary battery 120 may discharge electric power to the auxiliary machines 140 as well as to the drive motor 220.

Also during the period from the timing t1 to the timing t2 in FIG. 2, the voltage decrease of the secondary battery 120 causes an increase of power loss in the secondary-battery converter 130. This is because a voltage decrease of the secondary battery 120 causes an expansion of voltage difference between the low-voltage DC line DCL side and the high-voltage DC line DCH side of the secondary-battery converter 130. Power loss in the converter increases more and more with increasing voltage difference between input side and output side of the converter.

At the timing t2 in FIG. 2, electric power outputted from the fuel cell 100 to the drive motor 220 comes to zero. In this state, electric power supplied to the drive motor 220 being under power-running operation fully corresponds to the electric power discharged from the secondary battery 120.

At timing t3 in FIG. 2, the driver of the vehicle having the fuel cell system 10 mounted thereon sets the accelerator openness to zero. At timing t4, which is a timing over a certain time elapse since the timing t3, operation of the drive motor 220 shifts from power-running operation to regenerative operation.

During a period from the timing t1 to the timing t4 in FIG. 2, the controller 160 exerts such control that the quantity of electric power to be discharged from the secondary battery 120 to the drive motor 220 is increased to an extent corresponding to an increment of power loss in the secondary-battery converter 130 attributable to discharge of electric power from the secondary battery 120 that has been continued since the accelerator 210's acceptance of a deceleration instruction. A secondary battery has such a characteristic that its internal resistance is increased by continued electrical discharge. Due to this, as the secondary battery 120 continuously discharges, the charge rate of the secondary battery 120 decreases while the internal resistance of the secondary battery 120 increases, causing the voltage of the secondary battery 120 to decrease. This leads to an expansion of voltage difference between the low-voltage DC line DCL side and the high-voltage DC line DCH side of the secondary-battery converter 130. Accordingly, due to an increase of power loss in the secondary-battery converter 130 that steps up electric power discharged from the secondary battery 120, the quantity of power consumption due to the discharge of the secondary battery 120 can be further increased to an extent corresponding to the increment of power loss in the secondary-battery converter 130.

At the timing t4 in FIG. 2, the controller 160 controls the motor inverter 150 to shift the drive motor 220 from power-running operation to regenerative operation. Then, the controller 160 instructs the auxiliary machines 140 to start operating, where electric power discharged from the secondary battery 120 as well as regenerative power developed by regenerative operation of the drive motor 220 are supplied to the auxiliary machines 140 until the regenerative operation is terminated. In this case, the controller 160 makes the secondary battery 120 continuously execute discharge of electric power that has been lasting from under the power-running operation. Also, the controller 160 controls the secondary-battery converter 130 so that regenerative power is supplied from the drive motor 220 to the auxiliary machines 140.

After the timing t4 onward in FIG. 2, power loss in the secondary-battery converter 130 increases. As to the reason of this, as the secondary battery 120 keeps discharging continuously from under power-running operation, the charge rate of the secondary battery 120 decreases while the internal resistance of the secondary battery 120 increases, causing the voltage of the secondary battery 120 to decrease. This leads to an expansion of voltage difference between the secondary battery 120 side and the drive motor 220 side of the secondary-battery converter 130. Accordingly, there results an increase of power loss in the secondary-battery converter 130 that steps down regenerative power and feeds the power to the low-voltage DC line DCL side.

With a constant electric power required by the auxiliary machines 140 operated at the timing t4 in FIG. 2, as the voltage of the secondary battery 120 decreases with time elapse, the power loss in the secondary-battery converter 130 increases. This results in a decrease of the ratio of regenerative power occupying in the electric power supplied to the auxiliary machines 140, so that the quantity of power consumption due to the discharge of the secondary battery 120 can be increased to an extent corresponding to the decrement of the ratio of the regenerative power.

After the timing t4 onward in FIG. 2, the controller 160, upon an end of the regenerative operation of the drive motor 220, stops the operation of the auxiliary machines 140 to stop the power supply from the secondary battery 120. In addition, in the case where the controller 160, while executing a sequence of processes described in FIG. 2, accepts an acceleration instruction from the driver of the vehicle having the fuel cell system 10 mounted thereon, the controller 160 forcibly ends the sequence of processes described in FIG. 2 even during the execution of those steps.

According to the embodiment described above, when the accelerator 210 has accepted a deceleration instruction, electric power can be discharged from the secondary battery 120 during the power-running operation which lasts until transition to the regenerative operation while the torque is being decreased. In this case, voltage of the secondary battery 120 decreases due to discharge of the secondary battery 120, causing an expansion of the voltage difference between the low-voltage DC line DCL side and the high-voltage DC line DCH side of the secondary-battery converter 130, with the result that the power loss in the secondary-battery converter 130 is increased. Therefore, in the first embodiment including the drive motor 220 as an object to which electric power is discharged from the secondary battery 120, the quantity of power consumption due to the discharge of the secondary battery 120 can be increased to an extent corresponding to the increment of power loss in the secondary-battery converter 130. Thus, since discharging electric power from the secondary battery 120 makes it possible to lower the charge rate of the secondary battery 120 and increase unused capacity that allows regenerative power to be charged into the secondary battery 120, it becomes possible to suppress increases in frequency at which the auxiliary machines 140 are operated to consume the regenerative power. Under the power-running operation executed while the torque is being decreased after the accelerator 210's acceptance of a deceleration instruction, the quantity of electric power required by the drive motor 220 can be satisfied only by the electric power outputted from the fuel cell 100. In this embodiment, the quantity of output power of the fuel cell 100 is daringly decreased to more than a decrement responsive to the deceleration instruction, so that the portion of electric power decreased to an extent in excess of the decrement of output power of the fuel cell 100 responsive to the deceleration instruction is discharged from the secondary battery 120. Thus, opportunities for the secondary battery 120 to discharge are increased.

Also in the first embodiment, the controller 160 exerts such control that the quantity of electric power to be discharged from the secondary battery 120 to the drive motor 220 is increased to an extent corresponding to an increment of power loss in the secondary-battery converter 130 attributable to discharge of electric power from the secondary battery 120 that has been continued since the accelerator 210's acceptance of the deceleration instruction. Therefore, as the secondary battery 120 continues discharging, the charge rate of the secondary battery 120 decreases while the internal resistance of the secondary battery 120 increases, causing the voltage of the secondary battery 120 to decrease. This leads to an expansion of voltage difference between the low-voltage DC line DCL side and the high-voltage DC line DCH side of the secondary-battery converter 130. Thus, due to an increase of power loss in the secondary-battery converter 130 that steps up electric power discharged from the secondary battery 120, the quantity of power consumption due to the discharge of the secondary battery 120 can be further increased to an extent corresponding to the increment of power loss in the secondary-battery converter 130.

Also in the first embodiment, when the operation of the drive motor 220 has shifted from power-running operation to regenerative operation, the controller 160 exerts such control that discharge of electric power from the secondary battery 120 is executed continuously from under the power-running operation while electric power discharged from the secondary battery 120 as well as regenerative power developed by the regenerative operation of the drive motor 220 are supplied to the auxiliary machines 140 until an end of the regenerative operation. Due to this, as the secondary battery 120 keeps continuously discharging, the charge rate of the secondary battery 120 decreases while the internal resistance of the secondary battery 120 increases, causing the voltage of the secondary battery 120 to decrease. This leads to an expansion of voltage difference between the low-voltage DC line DCL side and the high-voltage DC line DCH side of the secondary-battery converter 130. Thus, there results an increase of power loss in the secondary-battery converter 130 that steps down regenerative power, so that the ratio of regenerative power occupying in the electric power supplied to the auxiliary machines 140 decreases with time elapse. As a consequence, it becomes possible to increase the quantity of power consumption due to the discharge of the secondary battery 120. Thus, while the auxiliary machines 140 are being operated to consume the regenerative power, the charge rate of the secondary battery 120 can be decreased and unused capacity that allows regenerative power to be charged into the secondary battery 120 can be increased. Accordingly, it becomes possible to suppress increases in frequency at which the auxiliary machines 140 are operated to consume the regenerative power. In other words, opportunities for the secondary battery 120 to discharge are provided while the auxiliary machines 140 are being operated to consume the regenerative power, by which opportunities for providing unused capacity that allows regenerative power to be charged into the secondary battery 120 can be increased. Consequently, on the basis that the frequency at which the secondary battery 120 is charged with regenerative power can be increased, it becomes possible to suppress increases in frequency at which the auxiliary machines 140 are operated to consume the regenerative power.

B. Modifications

B1. Modification 1

With the fuel cell system 10 of the first embodiment, discharge from the secondary battery 120 is executed both in regenerative operation and power-running operation from the accelerator 210's acceptance of a deceleration instruction until transition to the regenerative operation. However, the present disclosure is not limited to this. For example, the fuel cell system 10 may also be so arranged that the secondary battery 120 is allowed to discharge only while the drive motor 220, with its torque being decreased, keeps executing the power-running operation since the accelerator 210's acceptance of a deceleration instruction, and that the secondary battery 120, being inhibited from discharging, is charged with regenerative power while the drive motor 220 is executing the regenerative operation.

B2. Modification 2

With the fuel cell system 10 of the first embodiment, the secondary battery 120 does not discharge electric power to the drive motor 220 before the accelerator 210's acceptance of a deceleration instruction at the timing t1 in FIG. 2. However, the present disclosure is not limited to this. For example, the secondary battery 120 may also be so arranged as to discharge electric power to the drive motor 220 in compensation for an insufficiency of electric power outputted by the fuel cell 100 even before the accelerator 210's acceptance of a deceleration instruction. In this case, discharge from the secondary battery 120 is continued before and after the accelerator 210's acceptance of a deceleration instruction. In this case also, the secondary battery 120 may discharge electric power to the auxiliary machines 140 in addition to the drive motor 220.

B3. Modification 3

With the fuel cell system 10 of the first embodiment, regenerative power developed by regenerative operation of the drive motor 220 is supplied to the auxiliary machines 140. However, the present disclosure is not limited to this. For example, with a fuel cell system including an air compressor which is electrically connected to a line interconnecting the secondary-battery converter 130 and the motor inverter 150, regenerative power may also be supplied, and thereby consumed, to the air compressor as well as to the auxiliary machines 140.

With the fuel cell system 10 of the first embodiment, in the case where the accelerator 210 has accepted a deceleration instruction under a condition that the charge rate of the secondary battery 120 is equal to or more than a preset value, the controller 160 makes electric power discharged from the secondary battery 120. However, the present disclosure is not limited to this. For example, the fuel cell system 10 may also be so arranged that electric power is discharged from the secondary battery 120 when the accelerator 210 has accepted a deceleration instruction under a condition that chargeable electric power of the secondary battery 120 is equal to or less than a preset value. The term, chargeable electric power of the secondary battery 120, refers to a ratio of chargeable quantity to the charge capacity of the secondary battery 120. For example, when the charge rate of the secondary battery 120 is 70%, the chargeable electric power of the secondary battery 120 is 30%.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) In one aspect of the present disclosure, there is provided a fuel cell system. The fuel cell system, which is to be mounted on a vehicle, includes: a fuel cell for generating electric power by using reactant gas; a secondary battery capable of charging and discharging electric power; a converter electrically connected between a drive motor for driving the vehicle and the secondary battery to perform voltage conversion between the drive motor and the secondary battery; and a controller for controlling the fuel cell system, wherein the controller exerts such control that when an accelerator for accepting a speed control instruction for the vehicle has accepted a deceleration instruction under a condition that a charge rate of the secondary battery is equal to or more than a preset value, or when the accelerator has accepted a deceleration instruction under a condition that a chargeable electric power of the secondary battery is equal to or less than a preset value, electric power is discharged from the secondary battery during a period of power-running operation lasting until the drive motor with its torque being decreased shifts to regenerative operation. According to this aspect, when the accelerator has accepted a deceleration instruction, electric power can be discharged from the secondary battery during a period of power-running operation, which is executed with the torque being decreased. In this case, a voltage decrease of the secondary battery due to the discharge of the secondary battery causes an expansion of voltage difference between the secondary battery side and the drive motor side of the converter, leading to an increase of power loss in the converter that steps up electric power discharged from the secondary battery. Therefore, in the case where the drive motor is included among objects to which electric power is discharged from the secondary battery, the quantity of the power consumption due to the discharge of the secondary battery can be increased to an extent corresponding to the increment of power loss in the converter. Thus, since discharging electric power from the secondary battery makes it possible to lower the charge rate of the secondary battery and increase unused capacity that allows regenerative power to be charged into the secondary battery, it becomes possible to suppress increases in frequency at which auxiliary machines are operated to consume the regenerative power.

(2) In the fuel cell system of the above-described aspect, the controller may exert such control that when the accelerator has accepted a deceleration instruction under a condition that a charge rate of the secondary battery is equal to or more than a preset value, or when the accelerator has accepted a deceleration instruction under a condition that a chargeable electric power of the secondary battery is equal to or less than a preset value, a quantity of electric power to be discharged from the secondary battery to the drive motor may be increased to an extent corresponding to an increment of power loss in the converter attributable to discharge of electric power from the secondary battery that has been continued since the acceptance of the deceleration instruction. According to this aspect, as the secondary battery continues discharging, the charge rate of the secondary battery decreases while the internal resistance of the secondary battery increases, causing the voltage of the secondary battery to decrease. This leads to an expansion of voltage difference between the secondary battery side and the drive motor side of the converter. Thus, due to an increase of power loss in the converter that steps up electric power discharged from the secondary battery, the quantity of power consumption due to the discharge of the secondary battery can be further increased to an extent corresponding to the increment of power loss in the converter.

(3) In the above-described aspects, the fuel cell system may further include an auxiliary machine which is connected to a DC line interconnecting the secondary battery and the converter and which operates by consuming electric power, wherein the controller may exert such control that when operation of the drive motor has shifted from the power-running operation, which is executed with its torque being decreased, to the regenerative operation after the accelerator's acceptance of a deceleration instruction under a condition that a charge rate of the secondary battery is equal to or more than a preset value or after the accelerator's acceptance of a deceleration instruction under a condition that a chargeable electric power of the secondary battery is equal to or less than a preset value, it follows that discharge of electric power from the secondary battery is executed continuously from under the power-running operation and moreover electric power discharged from the secondary battery as well as regenerative power developed by the regenerative operation are supplied to the auxiliary machine until the regenerative operation is ended. According to this aspect, as the secondary battery keeps continuously discharging, the charge rate of the secondary battery decreases while the internal resistance of the secondary battery increases, causing the voltage of the secondary battery to decrease. This leads to an expansion of voltage difference between the secondary battery side and the drive motor side of the converter. Thus, power loss in the converter that steps down regenerative power increases, so that the ratio of regenerative power occupying in the electric power supplied to the auxiliary machine decreases with time elapse. As a consequence, it becomes possible to increase the quantity of power consumption due to the discharge of the secondary battery. Thus, while the auxiliary machine is being operated to consume the regenerative power, the charge rate of the secondary battery can be decreased and unused capacity that allows regenerative power to be charged into the secondary battery can be increased. Accordingly, it becomes possible to suppress increases in frequency at which the auxiliary machine is operated to consume the regenerative power.

(4) The fuel cell system of the above-described aspect may further include an auxiliary machine which is connected to a DC line interconnecting the secondary battery and the converter and which operates by consuming electric power, wherein the controller may make electric power discharged from the secondary battery to at least one of the drive motor and the auxiliary machine.

The embodiment of the present disclosure is not limited to the fuel cell system, and may be applied to various modes such as a fuel cell system to be mounted on vehicles or ships operable on electric power as a power source, as well as to vehicles or ships themselves. The disclosure may also be implemented in a mode of a computer program or the like that allows the above modes to be implemented. Moreover, without being limited to the above-described modes at all, the disclosure may of course be implemented in various modes unless those modes depart from the gist of the disclosure.

What is claimed is:

1. A fuel cell system to be mounted on a vehicle, comprising:
   a fuel cell configured to generate electric power by using reactant gas;
   a secondary battery configured to be capable of charging and discharging electric power;
   a converter electrically connected between a drive motor for driving the vehicle and the secondary battery, the converter being configured to perform voltage conversion between the drive motor and the secondary battery; and
   a controller configured to control the fuel cell system, wherein
   the controller is configured to exert such control that when an accelerator for accepting a speed control instruction for the vehicle has accepted a deceleration instruction under a condition that a charge rate of the secondary battery is equal to or more than a preset value, or when the accelerator has accepted a deceleration instruction under a condition that a chargeable electric power of the secondary battery is equal to or less than a preset value, electric power is discharged from the secondary battery during a period of power-running operation of the drive motor with its torque being decreased before the drive motor begins regenerative operation.

2. The fuel cell system in accordance with claim 1, wherein
   the controller is configured to exert such control that when the accelerator has accepted a deceleration instruction under a condition that a charge rate of the secondary battery is equal to or more than a preset value, or when the accelerator has accepted a deceleration instruction under a condition that a chargeable electric power of the secondary battery is equal to or less than a preset value, a quantity of electric power to be discharged from the secondary battery to the drive motor is increased to an extent corresponding to an increment of power loss in the converter attributable to discharge of electric power from the secondary battery that has been continued since the acceptance of the deceleration instruction.

3. The fuel cell system in accordance with claim 1, further comprising
   an auxiliary machine connected to a DC line interconnecting the secondary battery and the converter, the auxiliary machine being configured to operate by consuming electric power, wherein
   the controller is configured to exert such control that when operation of the drive motor has shifted from the power-running operation, which is executed with its torque being decreased, to the regenerative operation after the accelerator's acceptance of a deceleration instruction under a condition that a charge rate of the secondary battery is equal to or more than a preset value or after the accelerator's acceptance of a deceleration instruction under a condition that a chargeable electric power of the secondary battery is equal to or less than a preset value, it follows that discharge of electric power from the secondary battery is executed continuously from under the power-running operation and moreover electric power discharged from the secondary battery as well as regenerative power developed by the regenerative operation are supplied to the auxiliary machine until the regenerative operation is ended.

4. The fuel cell system in accordance with claim 1, further comprising
   an auxiliary machine connected to a DC line interconnecting the secondary battery and the converter, the auxiliary machine being configured to operate by consuming electric power, wherein
   the controller is configured to cause at least one of the drive motor and the auxiliary machine to consume electric power discharged from the secondary battery.

* * * * *